(12) United States Patent
Kumar et al.

(10) Patent No.: US 9,575,747 B2
(45) Date of Patent: Feb. 21, 2017

(54) AUTOMATIC CONFIGURATION OF A COMPUTER SYSTEM BASED ON PROCESS MODELING OF AN IMPLEMENTED PROCESS

(71) Applicant: Microsoft Technology Licensing, LLC, Redmond, WA (US)

(72) Inventors: Deepak Kumar, Redmond, WA (US); Aditya Makarand Desai, Bellevue, WA (US); Arijit Basu, Bellevue, WA (US); Yen Ping Yu, Bothel, WA (US); Manoj Swaminathan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 14/157,756

(22) Filed: Jan. 17, 2014

(65) Prior Publication Data
US 2015/0006878 A1 Jan. 1, 2015

Related U.S. Application Data

(60) Provisional application No. 61/840,247, filed on Jun. 27, 2013.

(51) Int. Cl.
*G06F 1/24* (2006.01)
*G06F 9/44* (2006.01)

(52) U.S. Cl.
CPC .............. *G06F 8/71* (2013.01); *G06F 8/355* (2013.01); *G06F 9/4401* (2013.01)

(58) Field of Classification Search
CPC ...... G06F 9/4411; G06F 9/44505; G06F 8/65; G06F 9/4401; G06F 15/7867
(Continued)

(56) References Cited

U.S. PATENT DOCUMENTS

| 5,774,667 A * | 6/1998 | Garvey | H04L 41/0813 709/222 |
| 6,374,224 B1 * | 4/2002 | Horiguchi | G06F 17/274 704/266 |

(Continued)

FOREIGN PATENT DOCUMENTS

WO 02069142 A1 9/2002

OTHER PUBLICATIONS

Wolfel, Klaus, "Automating ERP Package Configuration for Small Businesses",in Diploma Thesis, Jul. 21, 2010, 86 pages.
(Continued)

*Primary Examiner* — Thomas Lee
*Assistant Examiner* — Volvick Derose
(74) *Attorney, Agent, or Firm* — Thomas Marquis; Kate Drakos; Micky Minhas

(57) ABSTRACT

A configuration architecture automatically links the output of a business process modeler to a business system configuration tool. The output of the business process modeler is translated into a representation of a source business process that is used by the business system configuration tool to automatically generate configuration templates. A user can provide configuration information through the configuration templates. The configuration inputs are applied to an implementation of a business system to obtain a configured, working business system instance with the same functionality as the source business process.

20 Claims, 20 Drawing Sheets

(58) Field of Classification Search
USPC .......................................................... 713/100
See application file for complete search history.

(56) References Cited

U.S. PATENT DOCUMENTS

| | | | | |
|---|---|---|---|---|
| 6,892,192 | B1 | 5/2005 | Geddes et al. | |
| 2004/0015465 | A1 | 1/2004 | Gill | |
| 2004/0034857 | A1* | 2/2004 | Mangino | G06Q 10/06 718/104 |
| 2004/0230404 | A1* | 11/2004 | Messmer | G06Q 10/00 703/1 |
| 2005/0091093 | A1 | 4/2005 | Bhaskaran et al. | |
| 2005/0154742 | A1* | 7/2005 | Roth | G06F 8/00 |
| 2006/0149568 | A1 | 7/2006 | Dreiling et al. | |
| 2006/0195781 | A1* | 8/2006 | Jatavallabha | G06Q 10/10 715/208 |
| 2008/0086350 | A1* | 4/2008 | Ponessa | G06Q 10/06 705/7.29 |
| 2008/0270973 | A1* | 10/2008 | Edwards | G06Q 10/04 717/104 |
| 2008/0294485 | A1* | 11/2008 | Takeuchi | G06Q 10/00 705/7.26 |
| 2009/0037013 | A1* | 2/2009 | Hendler | G05B 19/41875 700/103 |
| 2009/0112666 | A1 | 4/2009 | Guo et al. | |
| 2011/0191128 | A1* | 8/2011 | Chao | G06Q 10/067 705/7.11 |
| 2011/0258138 | A1* | 10/2011 | Kulkarni | G06Q 10/10 705/348 |
| 2011/0292429 | A1* | 12/2011 | Morskate | H04N 1/00225 358/1.13 |
| 2012/0023345 | A1* | 1/2012 | Naffziger | G06F 1/3206 713/320 |
| 2012/0109664 | A1* | 5/2012 | Krishnapuram | G06Q 30/02 705/1.1 |
| 2012/0109984 | A1* | 5/2012 | Clark, Jr. | G06Q 10/06 707/754 |
| 2012/0124553 | A1* | 5/2012 | Eschenroeder | G06F 8/71 717/121 |
| 2012/0246611 | A1* | 9/2012 | Sawant | G06F 8/35 717/104 |
| 2012/0296687 | A1* | 11/2012 | Satyanarayana | G06Q 10/06 705/7.22 |
| 2013/0060596 | A1* | 3/2013 | Gu | G06Q 10/06 705/7.27 |
| 2013/0067456 | A1 | 3/2013 | Khilnani et al. | |
| 2013/0144786 | A1* | 6/2013 | Tong | G06Q 20/4014 705/44 |
| 2013/0304530 | A1* | 11/2013 | Chodavarapu | G06Q 10/0639 705/7.11 |
| 2014/0067016 | A1* | 3/2014 | Kaula | A61N 1/37247 607/59 |
| 2014/0380308 | A1* | 12/2014 | Hassine | G06F 9/45558 718/1 |

OTHER PUBLICATIONS

Smaizys, et al., "Business Rules Based Agile ERP Systems Development", in Journal of Informatica, vol. 20, Issue 3, Aug. 2009, 22 pages.

Mendling, et al., "Towards the Interchange of Configurable EPCs: An XML-based Approach for Reference Model Configuration", in Proceedings of the Enterprise Modelling and Information Systems Architectures, Oct. 24, 2005, 15 pages.

"Set Up a Company With RapidStart Services for Microsoft Dynamics NAV", Published on: Jul. 31, 2012, Available at: http://msdn.microsoft.com/en-us/library/hh179428(v=nav.70).aspx.

Bucher, et al., "Automatic Parameter Configuration for Inventory Management in SAP ERP/APO", in the Working Paper, Aug. 20, 2010, 32 pages.

International Search Report and Written Opinion for International Patent Application No. PCT/US 14/43747, date of mailing Sep. 22, 2015, date of filing: Jun. 24, 2014, 8 pages.

* cited by examiner

Basic Information

Question name: BankAccountTable

Question text: Bankaccount

Question description: The BankAccountTable table contains account values that do not include dimension attribute values.

Is this a required question? ⊙ No ○ Yes

Is this question displayed? ○ No ⊙ Yes

Table name:

Add table

Field(s): BankAccountTable ×
- ☒ AccountID
- ☒ BankGroupId
- ☒ CurrencyCode
- ☒ Name Generate and review template: ☐ Generate workbook Assign template: BankAccountTable_a0219c36-e ☐ Upload file ☐ Download assigned workbook

FIG. 3G

| | |
|---|---|
| Question name: | DepreciationMin |
| Question text: | Minimum depreciation amount |
| Question description: | Minimum depreciation amount when depreciating with reducing balance. |
| Is this a required question? | ⦿ No ○ Yes |
| Is this question displayed? | ○ No ⦿ Yes |
| Table name: | AssetParameter ⌄ |
| Field name: | DepreciationMin ⌄ |
| Base data type: | Real |
| Control type: | Textbook ⌄ |

FIG. 3H

Basic Information

Question name: Employee

Question text: Configure Employee

Question description: Employee

Is this a required question? ⊙ No ○ Yes

Is this question displayed? ○ No ⊙ Yes

Release version: Industry: Country/region:
AX2012 RTM (6.0) All All

Table name: Add table

Field(s):
Employee [x]
☑ AbsenceFromDate
☑ AbsenceSetupDataAreaID
☑ AbsenceSetupId
☑ Active
[<] [>]

Generate and review
template: ☐ Generate CSV file
Assign template: Employee_aa4d0761-f4de-48a ☐ Upload CSV ☐ Download assigned template

FIG. 3I

AUTOMATIC CONFIGURATION OF A COMPUTER SYSTEM BASED ON PROCESS MODELING OF AN IMPLEMENTED PROCESS

The present application is based on and claims the benefit of U.S. provisional patent application Ser. No. 61/840,247, filed Jun. 27, 2013, the content of which is hereby incorporated by reference in its entirety.

BACKGROUND

Computer systems are currently in wide use. In order to implement an instance of a computer system, the computer system is often modeled first and then configured.

By way of example, some computer systems include business systems, such as enterprise resource planning (ERP) systems, customer resource management (CRM) systems, line-of-business (LOB) systems, etc. In order to implement an instance of a business system, the business system is first often modeled by one or more analysts. The system is then often configured by one or more consultants. The analysts and consultants are often on two separate teams and information is often lost when the process moves from the analysis (or modeling) part of the process to the configuration (or implementation) part of the process. Also, this type of process has conventionally been almost entirely manual.

More specifically, the team of analysts often analyzes and models the business system before any configuration is done. The configuration consultant team then obtains information that represents the analysis and modeling, and configures a system based on that information. However, it is common for at least some of the modeling information generated by the team of analysts to be lost (or otherwise not carried forward) when the information is transferred for configuration.

Therefore, once the team of consultants configures the business system, it often does not entirely match the model that the analysts had created. This results in a relatively large amount of rework that is needed in order to make the configured system match the modeled system. Thus, because all of this is almost entirely manual, return on investment realized for the business system suffers.

The discussion above is merely provided for general background information and is not intended to be used as an aid in determining the scope of the claimed subject matter.

SUMMARY

A configuration architecture automatically links the output of a business process modeler to a business system configuration tool. The output of the business process modeler is translated into a representation of a source business process that is used by the business system configuration tool to automatically generate configuration templates. A user can provide configuration information through the configuration templates. The configuration inputs are applied to an implementation of a business system to obtain a configured, working business system instance with the same functionality as the source business process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3E-3I are illustrative user interface displays.

DETAILED DESCRIPTION

Figure 1:
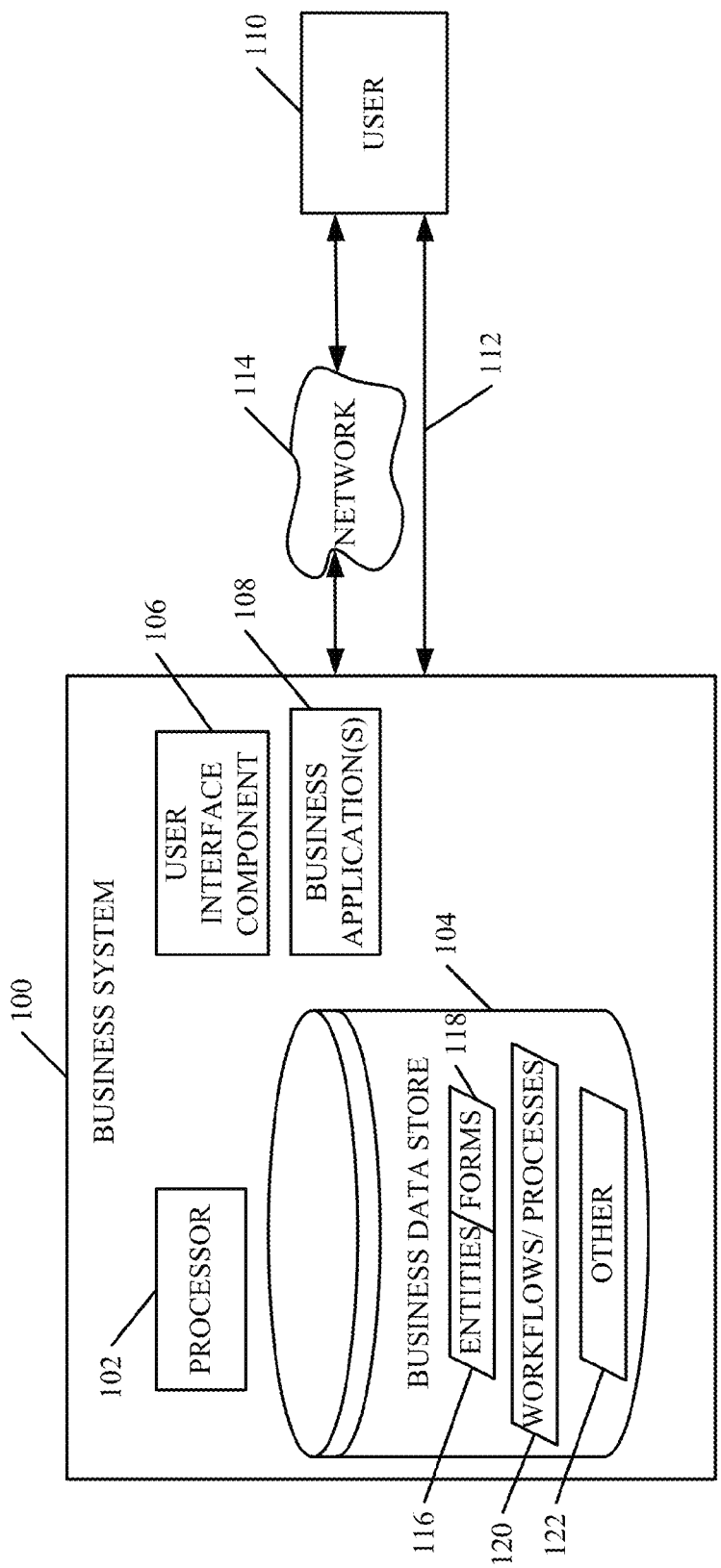
FIG. 1 is a block diagram of one illustrative business system.

FIG. 1 shows a block diagram of one embodiment of a business system 100. Business system 100 includes processor 102, business data store 104, user interface component 106 and one or more business applications 108. FIG. 1 shows that business system 100 can be accessed by user 110 either directly (as indicated by arrow 112) or over a network 114.

Business data store 104 illustratively includes a variety of different business information and business records. For instance, in one embodiment, business data store 104 includes entities 116, forms 118, workflows/processes 120, and other information 122. Entities 116 are illustratively business records that identify business items. For example, a vendor entity identifies and represents a vendor; a product entity identifies and represents a product; a customer entity identifies and represents a customer; an opportunity entity identifies and represents a business opportunity, etc. Business applications 108 illustratively run workflows/processes 120 and operate on entities and other business data in business data store 104 to implement an instance of a business system. By way of example, it can be an instance of an ERP system, a CRM system, an LOB system, etc. However, for the sake of simplicity, it will be described herein as an instance of an ERP system. Forms 118 illustratively present user interface elements to user 110 so that the user can access and manipulate business applications 108 and other items in business system 100.

FIG. 1 also shows that business data store 104 is a single data store and that it is local to business system 100. However, it can be multiple data stores and all can be local to business system 100, or remote therefrom or some can be local while others can be remote.

The business applications 108 illustratively include components or other types of applications that run on business system 100 to perform business operations, tasks, activities, workflows, etc. For instance, a business application 108 can be a general ledger application, an inventory application, a billing application, among others.

Processor 102 is illustratively a computer processor with associated memory and timing circuitry (not separately shown). It is illustratively a functional part of business system 100 and is activated by, and facilitates the functionally of, other applications and components or other items of business system 100.

User interface component 106 illustratively generates user interface displays, with corresponding user input mechanisms, for interaction by user 110. The user input mechanisms can take a wide variety of forms. For instance, they can be dropdown menus, icons, links, check boxes, text boxes, buttons, etc. In addition, the user input mechanisms can be actuated in a wide variety of different ways. Where the display device has a touch sensitive screen, the user input mechanism can be actuated using touch gestures. In addition, where the device used by user 110 or business system 100 includes a speech recognition system, then the user input mechanisms can be activated by voice commands. Also, the user input mechanisms can illustratively be actuated using a point and click device (such as a mouse or track ball), a keyboard, a keypad, a soft keyboard, a stylus, a thumbpad, or other methods.

In one embodiment, user 110 accesses business system 100 in order to perform business tasks, activities or operations or to generally manipulate business system 100 in order to conduct business. User 110 illustratively accesses business system 100 by logging onto it, and providing authentication information (such as a user name and password). Of course, other ways of accessing business system instance 100 can be used as well.

Figure 2:
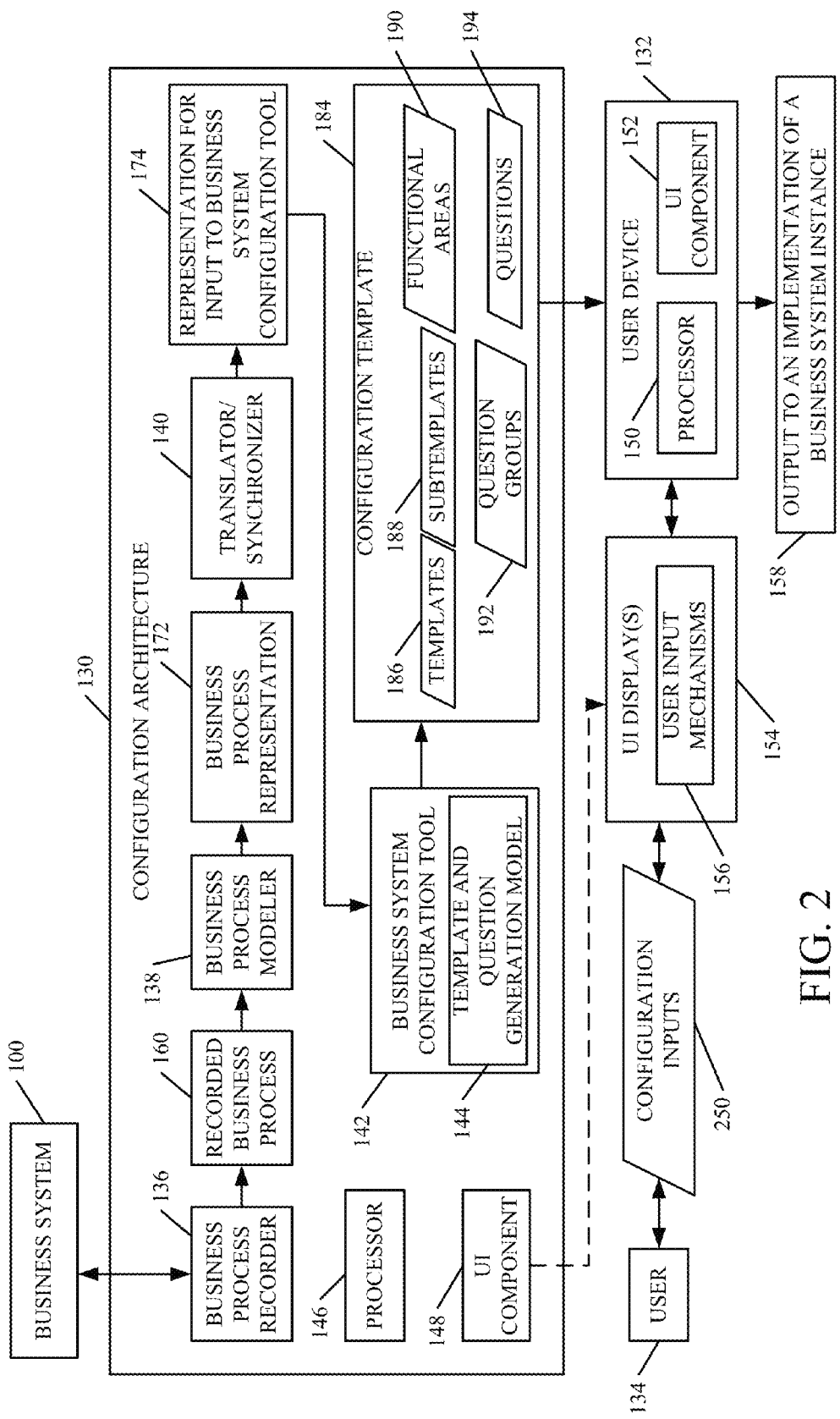
FIG. 2 is a block diagram of one illustrative embodiment of a configuration architecture.

FIG. 2 is a block diagram of one embodiment of a configuration architecture 130. FIG. 2 shows configuration architecture 130 coupled to business system 100 and user device 132. In general, configuration architecture 130 obtains a representation of a source business process from business system 100 (such as by having a user record one, as described below, or otherwise) and links it to business system configuration tool 142 to obtain configuration templates that can be used by user 134 to configure a business system with the same functionality as the source business process obtained from business system 100.

More specifically, configuration architecture 130 illustratively includes business process recorder 136, business process modeler 138, translator/synchronizer component 140, business system configuration tool 142 (that includes a template and question generation model 144), processor 146 and user interface component 148.

FIG. 2 also shows that user device 132 includes processor 150 and user interface component 142. User device 132 is shown generating user interface displays 154 with user input mechanisms 156 for interaction by user 134. User device 132 is also shown providing an output to an implementation of a business system instance, as indicated by block 158.

Figure 3:
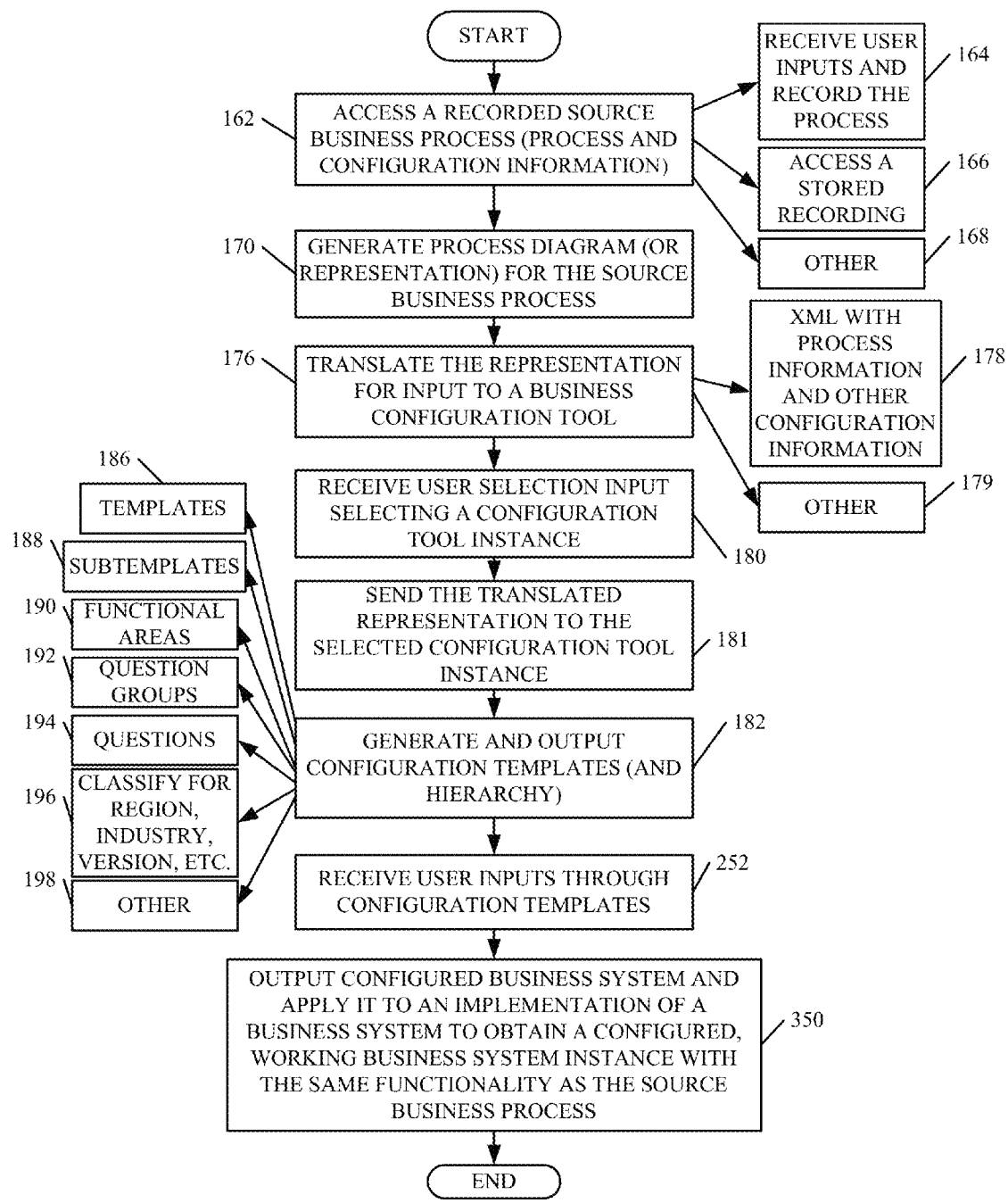
FIG. 3 is a flow diagram illustrating one embodiment of the operation of the configuration architecture shown in FIG. 2.

FIG. 3 is a flow diagram illustrating one embodiment of the overall operation of configuration architecture 130 in generating output 158. UI component 148 in configuration architecture 130 (or UI component 152 in user device 132) illustratively first provides a user interface display to user 134 so that configuration architecture 130 can access a recorded source business process that will include both a representation of the process, and configuration information related to the process. This is indicated by block 162 in FIG. 3. In one embodiment, user 134 operates business process recorder 136 to perform a business process within business system 100 so that business process recorder 136 can record the business process. In such an embodiment, business process recorder 136 provides a recorded business process 160 to business process modeler 138. Receiving user inputs and recording the source process is indicated by block 164.

In another embodiment, user 134 (or another user) has already recorded a business process and stored it in a place that is accessible by business process modeler 138. In that embodiment, business process modeler 138 simply accesses the already-recorded business process 160. Accessing an already-recorded, stored source process is indicated by block 166. Of course, business process modeler 138 can obtain access to a recorded source business process in other ways as well, and this is indicated by block 168.

Figure 3A:
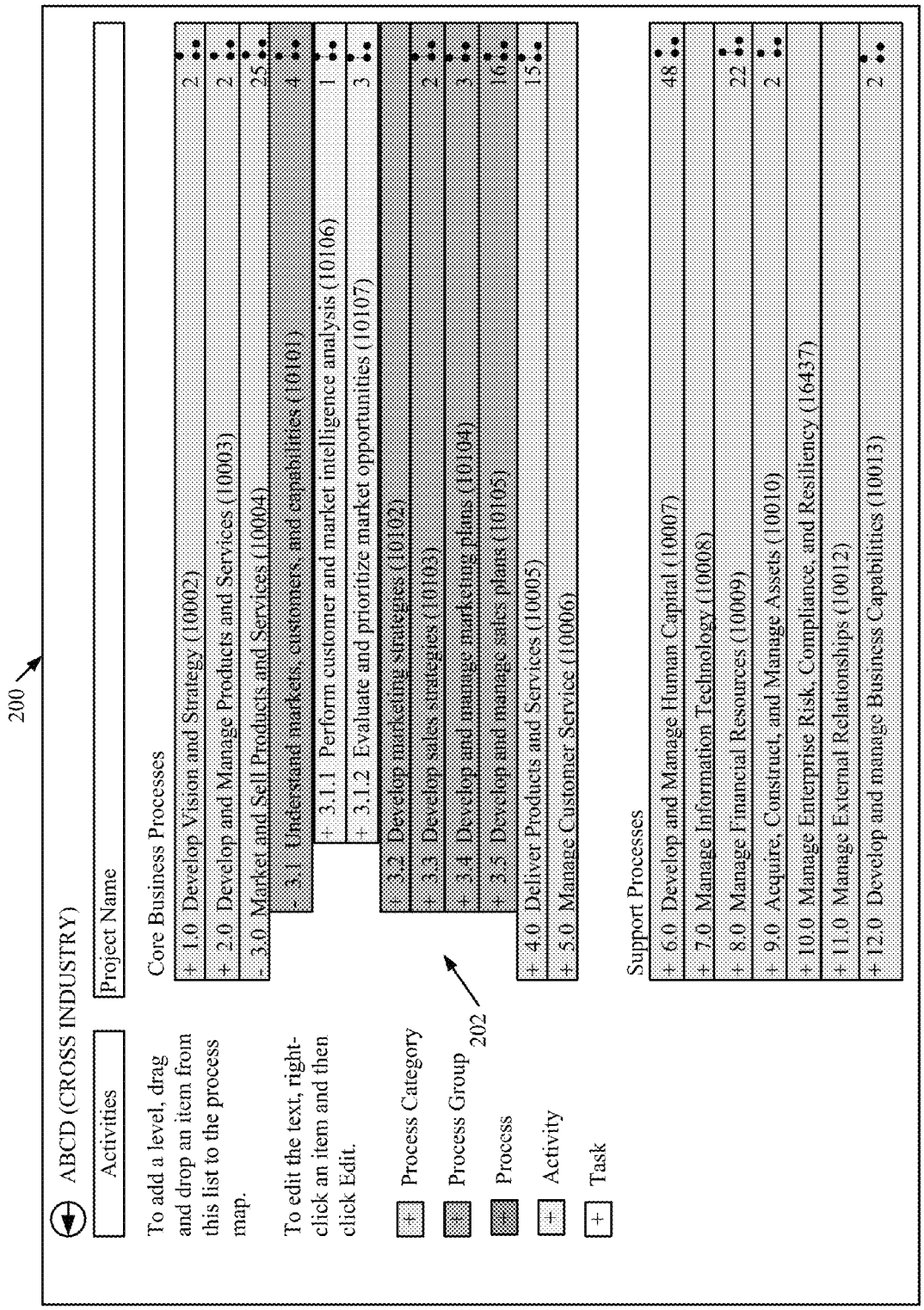
FIGS. 3A and 3B are illustrative user interface displays.

FIG. 3A shows one embodiment of a user interface display 200. User interface display 200 illustratively includes a hierarchical process structure 202 that has a plurality of nodes. The nodes that are indented with respect to other nodes are descendants (or child nodes) of the other nodes. Therefore, a node that is outdented with respect to an indented node is an ancestor or parent with respect to the immediately following indented nodes. In one embodiment, the processes represented by each node are also color coded to indicate where they fall in the hierarchy. User 134 can simply select one of the business processes by selecting one of the nodes in the hierarchy 202 in FIG. 3A. If an already-existing recording has been made for the corresponding process, that is provided to business process modeler 138 for modeling. If not, then user 134 is walked by business process recorder 136 through a series of user interface displays that allow user 134 to make a recording of the selected business process.

Figure 3B:
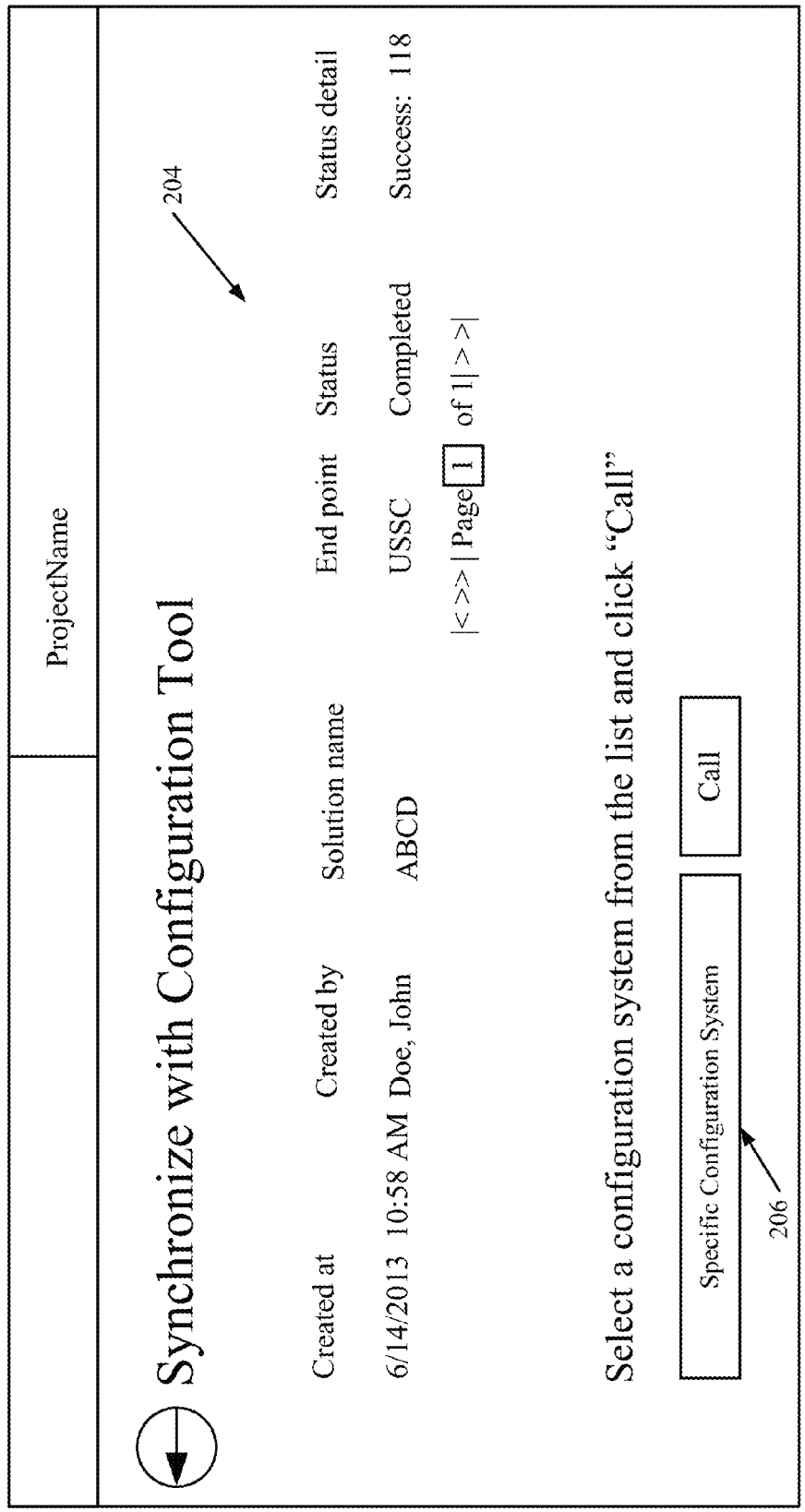

Once the user has selected the business process to be configured, user interface component 148 illustratively generates a user interface display with a user input mechanism that receives a user synchronization input to send the selected business process to a configuration tool. In response, user interface component 148 generates a user interface display such as display 204, shown in FIG. 3B. This includes a configuration system selection mechanism 206. In the embodiment shown in FIG. 3B, mechanism 206 is a dropdown menu, but it could be other mechanisms as well. The various instances of the configuration tool that the user has access to can be displayed in selectable form. Other instances can be displayed as well. In any case, user 134 illustratively selects a specific service instance of a configuration system that is to be used in configuring the selected process. Thus, the payload for the selected process will be delivered to the identified service instance selected by user 134.

In one embodiment, business process recorder 136 generates recorded business process 160 as a zip file which can be uploaded to a service instance of business process modeler 138. The zip file illustratively includes a variety of files (such as XML files) each corresponding to some activity (and hence each corresponding to a leaf node in the hierarchy 202). The files serve as the recorded business process 160 that is provided to business process modeler 138, and they illustratively include a description of tables that are to be configured in order to complete the business process implementation for the selected process.

Having received its input, business process modeler 138 generates a process diagram (or another representation) for the selected business process. This is indicated by block 170 in the flow diagram of FIG. 3. The business process representation is indicated by block 172 in FIG. 2. Translator/synchronizer 140 then translates representation 172 for input to business configuration tool 142. The representation of the business process that is provided to business configuration tool 142 is indicated by block 174 in FIG. 2. Translating the representation 172 into the representation 174 is indicated by block 176 in the flow diagram of FIG. 3. This can be done, for instance, by providing representation 174 as an XML file (or files) with process information and other configuration information. This is indicated by block 178. Of course, representation 174 can take other forms as well, and this is indicated by block 179. Receiving the user selection input selecting a configuration tool instance is indicated by block 180 and sending the translated representation of the business process to the selected configuration tool instance 142 is indicated by block 181.

Table 1 shows one illustrative embodiment of a sample schema that embodies a representation 174 that is expected by business system configuration tool 142.

TABLE 1

```
<Framework>
 <Id>rrrr</Id>
 <Name>
 </Name>
 <Version>6.2:158</Version>
 <SyncID>1BC10AFC-AEDA-4B67-8EC6-AC90FEAAA000</SyncID>
 <LeafID>DCEADEFC-6337-4E8B-86D1-6DCA9E214414</LeafID>
 <Level>
  <Category>aa</Category>
  <Name>aaaa</Name>
  <Description>
  </Description>
  <OperationsGroup>None</OperationsGroup>
  <FolderName>aaaa_DCEADEFC-</FolderName>
  <HasRecording>True</HasRecording>
  <ApplicationModule>Purchase order</ApplicationModule>
  <RecordingInformation>
    <Tables>
     <Table>
      <Name>BrazilParameters</Name>
      <TableGroup>Parameter</TableGroup>
      <CountryRegionCodes>BR</CountryRegionCodes>
      <AOS Authorization>None</AOS Authorization>
      <Label>Brazilian parameters</Label>
      <ConfigurationKey>
      </ConfigurationKey>
      <DeveloperDocumentation>The BrazilParameters table
contains parameters related to Brazilian localization features
</DeveloperDocumentation>
      <Shared>True</Shared>
      <Fields>
       <Field>
        <Name>ChronologicalInvoiceNumbering</Name>
        <Label>Enable fix issue date</Label>
        <Type>Enum</Type>
        <HelpText>Enable setting fixed issue dates at fiscal
documents types</HelpText>
        <IsRefRecId>False</IsRefRecId>
        <CountryRegionCodes>BR</CountryRegionCodes>
       </Field>
      </Fields>
     </Table>
    <DMFEntities>
     <Table>
      <Name>Customer</Name>
     </Table>
    </DMFEntities>
  </RecordingInformation>
  <SyncID>DCEADEFC-6337-4E8B-86D1-6DCA9E214414</SyncID>
 </Level>
</Framework>
The class representation of this XML file is as below:
 public class Framework : JsonEntityBase
 {
  public string Id { get; set; }
  public string Name { get; set; }
  public string Version { get; set; }
  public Guid SyncId { get; set; }
  public Guid LeafId { get; set; }
  public Node Level { get; set; }
 }
```

TABLE 1-continued

```
public class Node : JsonEntityBase
{
 public string Category { get; set; }
 public string Name { get; set; }
 public string Description { get; set; }
 public bool HasRecording { get; set; }
 public Guid SyncId { get; set; }
 public Node Level { get; set; }
 public string AXApplicationVersion { get; set; }
 public string IndustryCode { get; set; }
 public string CountryCode { get; set; }
 public Recording RecordingInformation { get; set; }
}
public class Recording : JsonEntityBase
{
 public string AXApplicationVersion { get; set; }
 public string IndustryCode { get; set; }
 public List<Table> Tables;
 public List<Table> DMFEntities;
}
public class Table : JsonEntityBase
{
 public string Name { get; set; }
 public string Label { get; set; }
 public string DeveloperDocumentation { get; set; }
 public string TableGroup { get; set; }
 public string ConfigurationKey { get; set; }
 public string Shared { get; set; }
 public string CountryRegionCodes { get; set; }
 public List<Field> Fields { get; set; }
}
public class Field : JsonEntityBase
{
 public string Name { get; set; }
 public string Label { get; set; }
 public string HelpText { get; set; }
 public string Type { get; set; }
 public string CountryRegionCodes { get; set; }
}
```

Once the representation 174 is sent to business system configuration tool 142, template and question generation model 144 is used to generate and output configuration templates, and a template hierarchy, corresponding to the selected business process. This is indicated by block 182 in FIG. 3. Configuration templates are indicated at 184 in FIG. 2.

In one embodiment, the configuration templates include templates 186, subtemplates 188, functional areas 190, question groups 192 and questions 194. The configuration templates can also classify or group the questions that are applicable to various regions, industries, versions of the business system that generated the business process, etc. This is indicated by block 196 in FIG. 3. The configuration templates can, of course, include other information as well, as indicated by block 198.

The XML in Table 1 automatically generates a template hierarchy which shows a number of different things. First, it identifies the parent node of the business process which generated it. It also identifies the subnode for which the configuration templates are generated, and all sub-templates and functional areas are based on a suitable heuristic. A list of questions and question groups are also automatically generated. In one embodiment, template and question generation model 144 reduces the number of questions to a minimal set and categorizes them for an easy answering experience. That is, it illustratively reduces the redundancy in the question and groups questions together so that the user can answer like questions in a group. This enhances the ability of the user to perform the process.

Once configuration templates 184 are generated, they can be provided to user 134 either directly, or through a user device such as user device 132. In the case where they are provided directly, UI component 148 generates user interface displays 154. However, where they are provided through user device 132, UI component 152 generates user input displays 154. Displays 154 present the templates, subtemplates, question groups and questions to user 134 so that user 134 can provide configuration inputs 250, through the templates, subtemplates, question groups and questions. Receiving user inputs through the configuration templates 184 is indicated by block 252 in the flow diagram of FIG. 3.

Figure 3C:
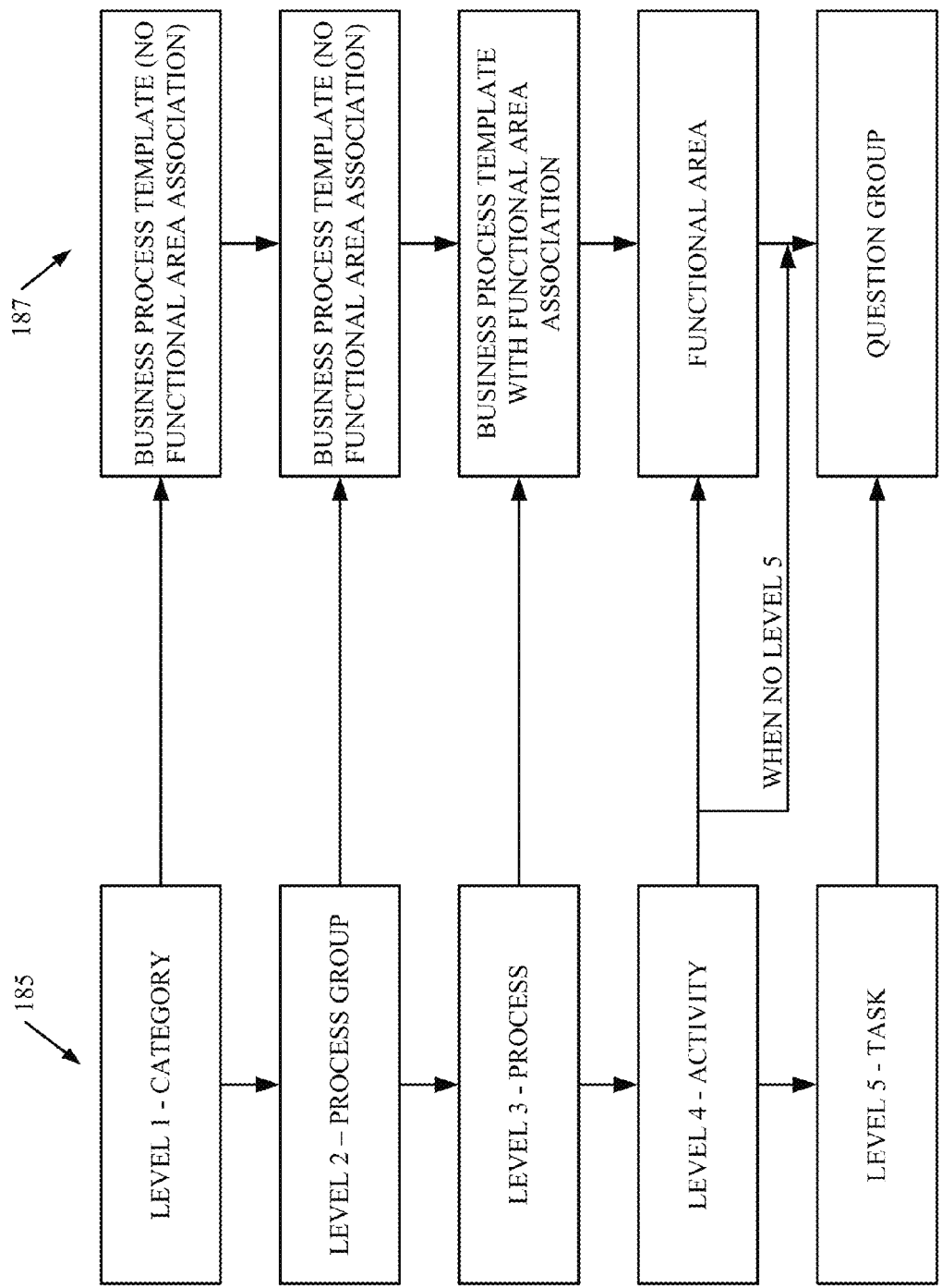
FIG. 3C shows one illustrative mapping between an output of a business process modeler and a business system configuration tool.

Table 2 below shows one illustrative description that template and question generation model 144 can use to automatically generate configuration templates 184. FIG. 3C shows one example of a mapping between the information 185 in Table 2 and the templates, functional areas and question groups 187 that are generated by business system configuration tool 142. It will be noted that the mapping in FIG. 3C is just one embodiment. Other mappings can be used as well. For instance, the information can be mapped to a functional area, or business module, instead of just to a business process. Also, the information in Table 2 and the map in FIG. 3 can be different. They can reflect any other type of hierarchy, or even a flat structure.

TABLE 2

| | |
|---|---|
| Level 1 - Category | 1.0 Develop Vision and Strategy (10002) |
| Represents the highest level of process in the enterprise, such as Manage customer service, Supply chain, Financial organization, and Human resources. | |
| Level 2 - Process Group | 1.1 Define the business concept and long-term vision (10014) |
| Indicates the next level of processes and represents a group of processes. Perform after sales repairs, Procurement, Accounts payable, Recruit/source, and Develop sales strategy are examples of process groups. | |
| Level 3 - Process | 1.1.1 Accesses the external environment (10017) |
| A series of interrelated activities that converts inputs into results (outputs); processes consume resources and require standards for repeatable performance; and processes respond to control systems that direct the quality, rate, and cost of performance. | |
| Level 4 - Activity | 1.1.1.1 Analyze and evaluate competition (10021) |
| Indicates key events performed when executing a process. Examples of activities include Receive customer requests, Resolve customer complaints, and Negotiate purchasing contracts. | |
| Level 5 - Task | 12.2.3.1.1 Identify project requirements and objectives (11117) |
| Tasks represent the next level of hierarchical decomposition after activities. Tasks are generally much more fine grained and may vary widely across industries. Examples include: Create business case and obtain funding and Design recognition and reward approaches. | |

Figure 3D:
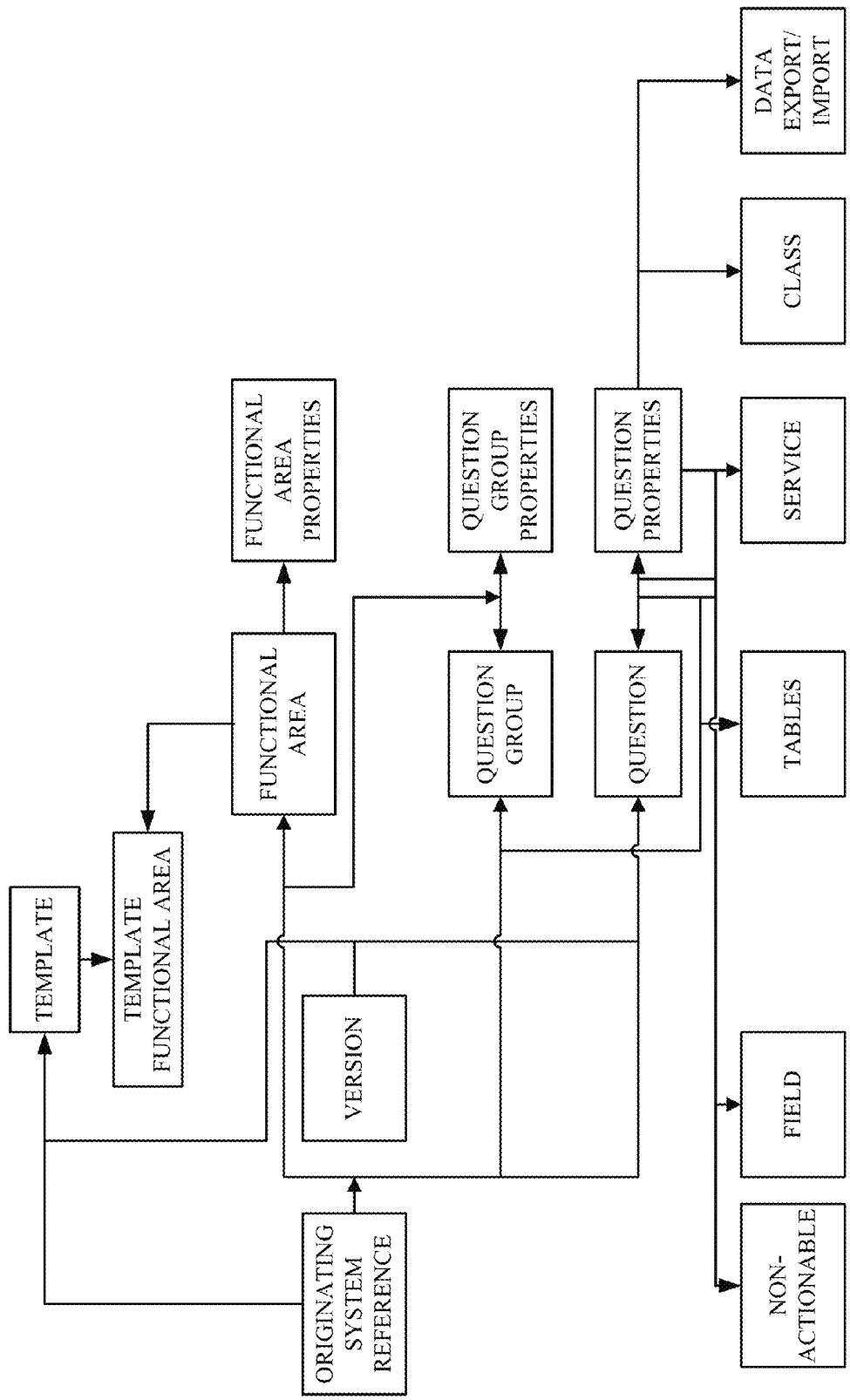
FIG. 3D shows one embodiment of a template and question generation model.

FIG. 3D is one embodiment of a high level view of template and question generation model 144.

Figure 3E:
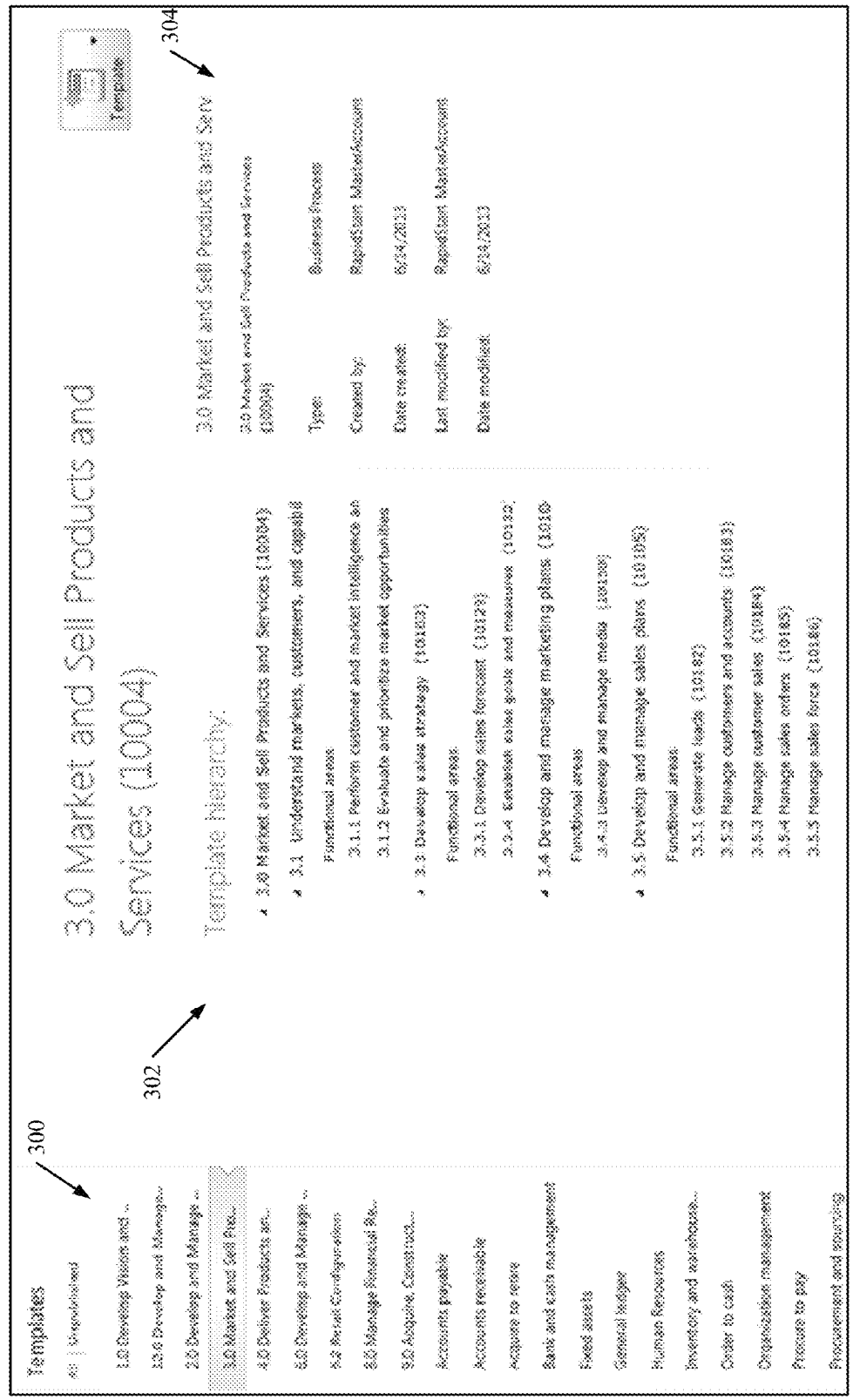

FIG. 3E shows one embodiment of a set of templates 184 that can be generated. The set of templates are listed in a flat view in template pane 300. When the user selects a template from template pane 300, the template hierarchy 302 for the selected template is displayed. In addition, generation display 304 shows some items of detail regarding the generation of the template hierarchy 302, by business system configuration tool 142.

Figure 3F:
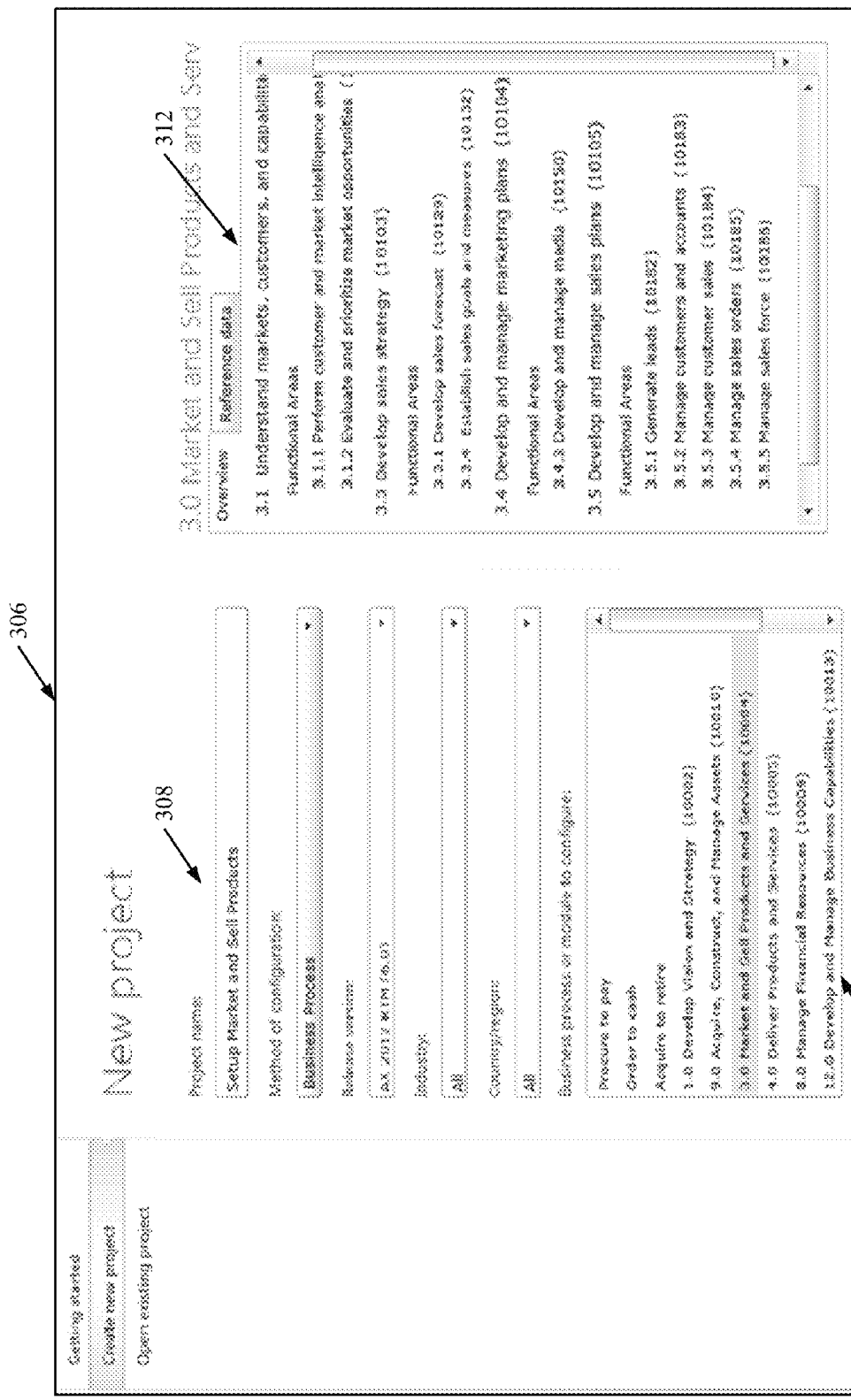

FIG. 3F shows a user interface display 306 that allows the user to select one of the templates in order to configure a business process or module corresponding to the template. The user can enter project information generally at 308, such as the project name, the method of configuration, the release version, the industry, the country or region, etc. The user can then select a template from template pane 310. The selected template, subtemplate and functional areas are then displayed in detail pane 312. The user can select one of the functional areas to review a set of questions or question groups that were automatically generated for that functional area.

User 134 can then provide configuration inputs 250 (shown in FIG. 2) through those questions in order to configure the business process.

FIGS. 3G-3I are illustrative user interface displays that show different question types, based upon the different metadata in the XML structure received from translator/synchronizer 140, at business system configuration tool 142. For instance, FIG. 3G shows that business system configuration tool 142 generates a table type question if the table to be configured is not a parameter table (as indicated by the metadata in Table 1).

FIG. 3H shows that business system configuration tool 142 generates a field type question if a field belonging to a parameter table is to be configured. In addition, FIG. 3I shows that business system configuration tool 142 generates a data import/export framework (DIEF) type question if a DIEF entity is to be configured.

It will be noted that there can be many other question types as well. For instance, the question types can include relations, abstract types, etc.

It should be noted that a large percent of parameters may be duplicated across different functional areas in a category. Therefore, in one embodiment, a functional area is created with a name referred to as "Parameters: Name of the category". This functional area contains all the parameters that are to be configured for the category. This avoids duplication and redundancy to expedite the process.

The questions and question groups, along with templates, subtemplates and functional areas are displayed for user 134 on UI displays 154. The user 134 provides configuration inputs 250 through the templates. This configuration information is then applied against an implementation of a business system to obtain a configured, working business system instance with the same functionality as the source business process. This is indicated by block 350 in FIG. 3.

It can thus be seen that configuration architecture 130 provides an automated way of creating configuration templates 184 and questions based on an input which represents a business process. Translator/synchronizer 140 automatically links business process modeler 138 to business system configuration tool 142 by providing the representation 174 of the business process being configured, in a form that is acceptable to business system configuration tool 142. The representation 174 can be an XML input file (or another file or it can be distributed in a database management system that the configuration architecture has access to) that contains the configuration objects which are needed to configure the source business process. It includes details about tables, fields which require values, regions for which the configuration is applicable and definition of a template hierarchy. While business process modeler 138 and business system configuration tool 142 are two separate tools, they are linked together, or integrated, in a way that allows the user to choose a service instance of tool 142 to which the representation 174 is to be sent. Tool 142 uses metadata from representation 174 to automatically generate the complete configuration templates, including templates, subtemplates, question groups and questions. The templates can be classified for region, industry and applicable business system version. These steps can be repeated multiple times so that additional components (or business processes) can be configured as easily as the first ones, or updates can be made easily as well.

In addition, configuration tool 142 can be used to configure other things as well, and not just business processes. For instance, input 174 to tool 142 can include information that describes system settings from business system 100. Tool 142 can be used to configure system settings in the new business system instance using this same template-based approach.

The configuration tool 142 can be used in different environments as well. For instance, instead of business process modeler 138, a more abstract scenario modeler can be used to model a system at a higher abstraction level than a business process (such as at a factory level). As an example, all roles and their corresponding activities can be modeled, mapped, and synchronized to tool 142. Tool 142 can then be used to generate configuration templates for the modeled system. Those templates can then be used to configure an autonomous system with the same behavior as the modeled system.

Figure 4:
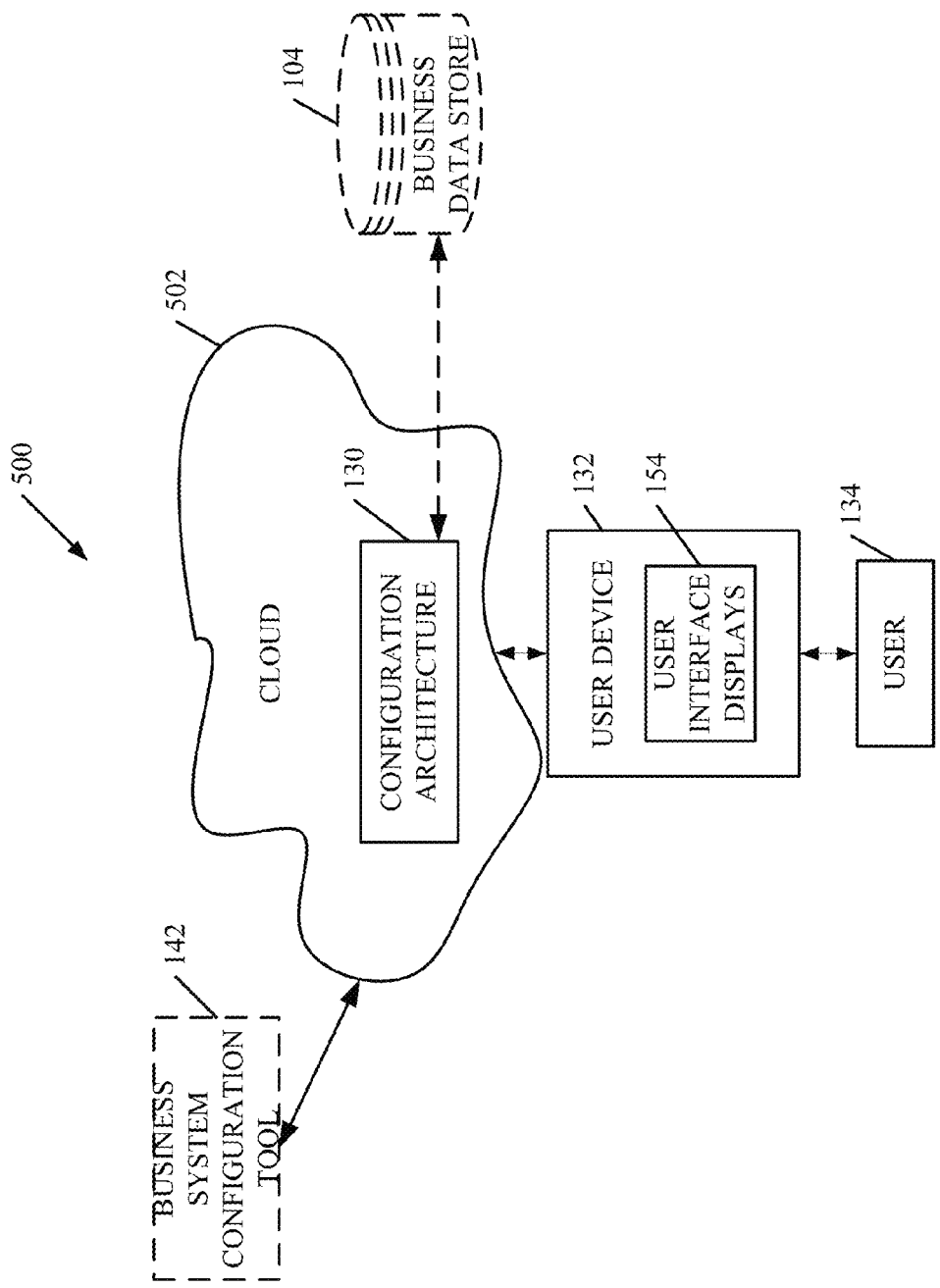
FIG. 4 shows one embodiment of the configuration architecture shown in FIG. 2 deployed in various other architectures.

FIG. 4 is a block diagram of architecture 130, shown in FIG. 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 130 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 2 and they are similarly numbered. FIG. 4 specifically shows that architecture 130 is located in cloud 502 (which can be public, private, or a combination where portions are public while others are private). Therefore, user 134 uses a user device 132 to access those systems through cloud 502.

FIG. 4 also depicts another embodiment of a cloud architecture. FIG. 4 shows that it is also contemplated that some elements of architecture 130 are disposed in cloud 502 while others are not. By way of example, data store 104 (which can be part of architecture 130) can be disposed outside of cloud 502, and accessed through cloud 502. In another embodiment, business system configuration tool 142 is also outside of cloud 502. Regardless of where they are located, they can be accessed directly by device 132, through a network (either a wide area network or a local area network), they can be hosted at a remote site by a service, or they can be provided as a service through a cloud or accessed by a connection service that resides in the cloud. All of these architectures are contemplated herein.

In addition, the representation 174 used as input to configuration tool 142 can be obtained from an on-premise system or a cloud-based system. The configuration templates 184 can then be used to generate output 158 which can be imported into another cloud-based or on-premise system. Alternatively, the configuration templates 184 can be exported from architecture 130 and imported into another system (cloud-based or on-premise) where they are used for configuration.

It will also be noted that architecture 130, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
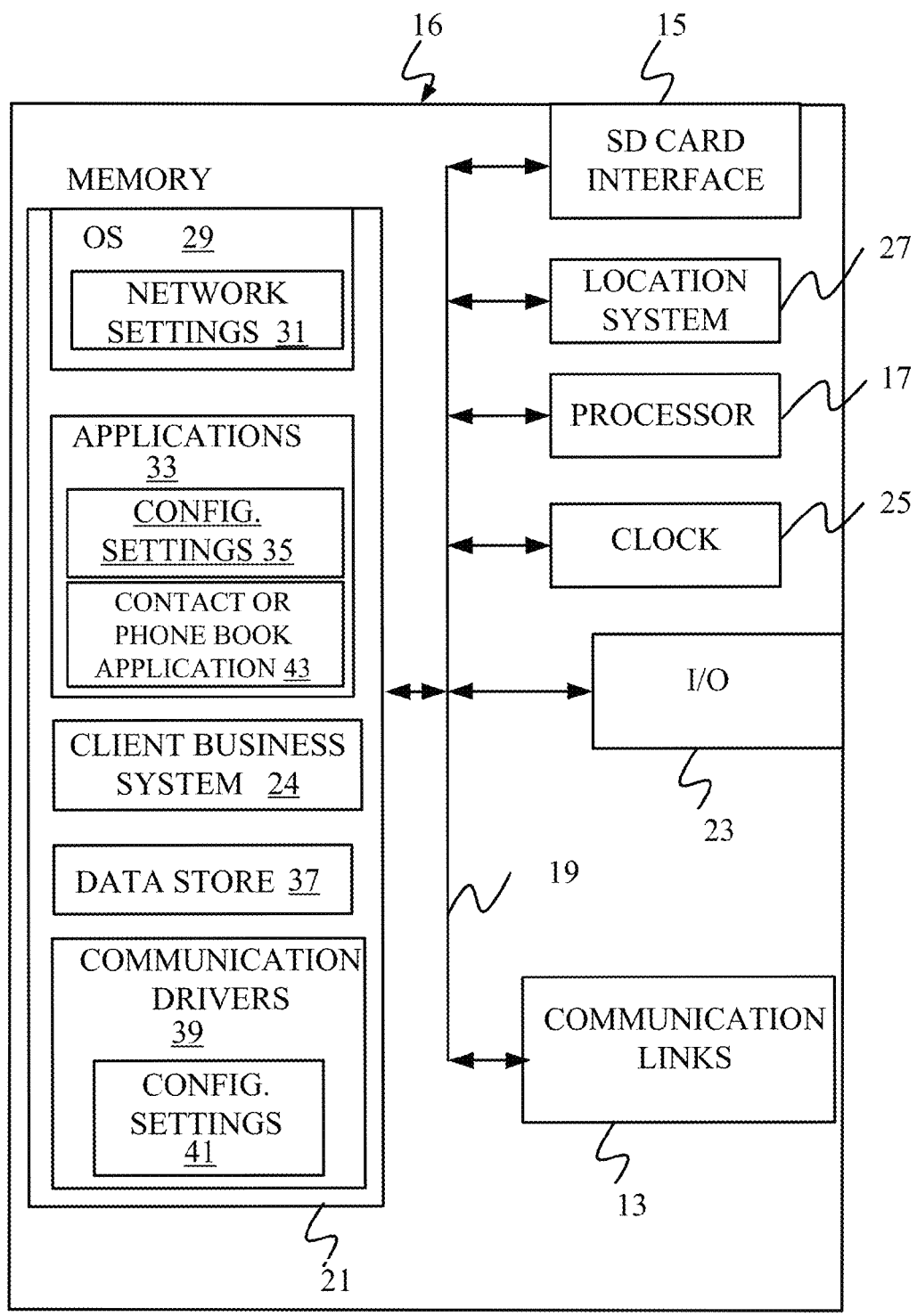
FIGS. 5-10 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-10 are examples of handheld or mobile devices.

FIG. 5 provides a general block diagram of the components of a client device 16 that can run components of architecture 130 or system 100 or that interacts with architecture 130, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 146 or 150 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of business system 100 or architecture 130. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
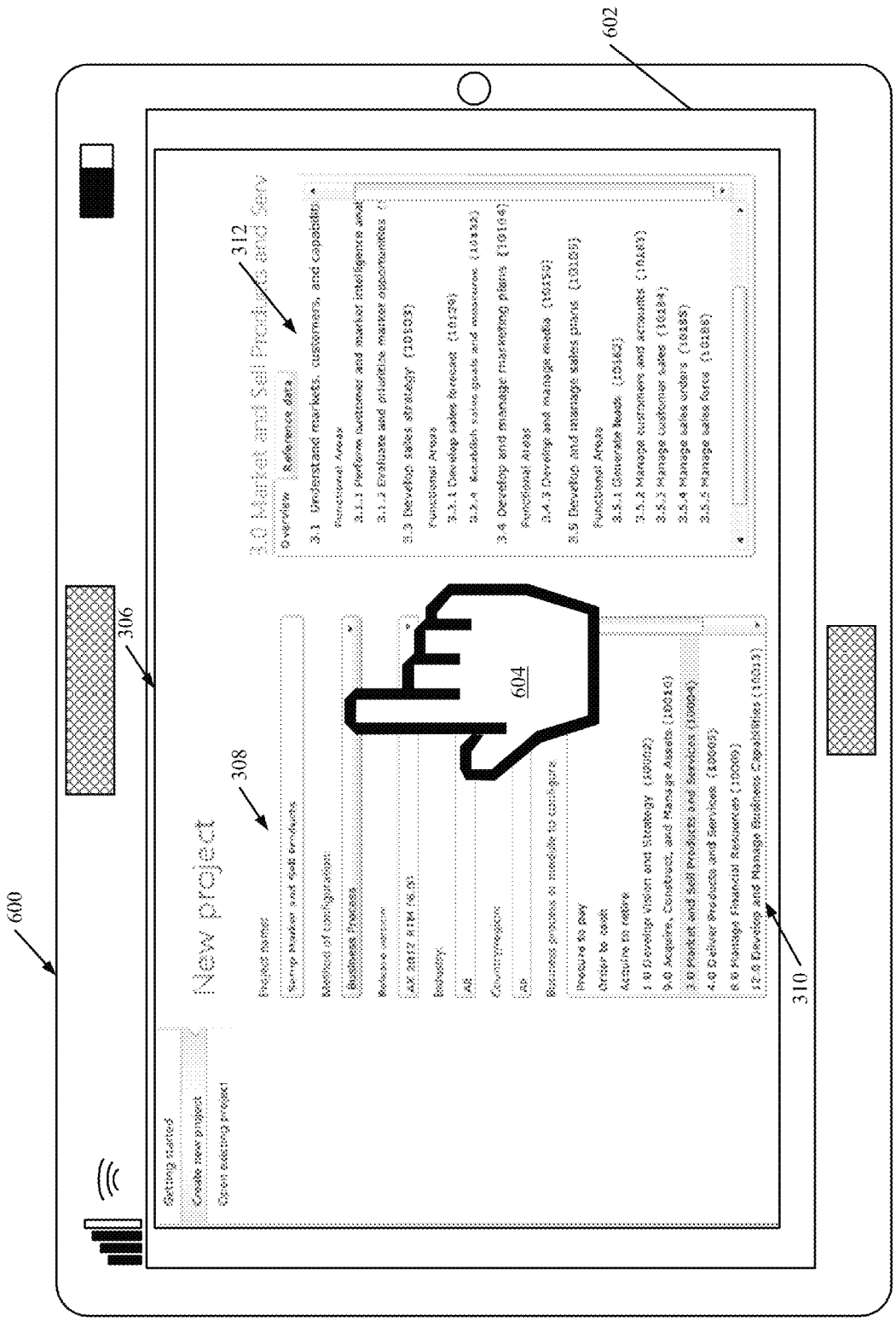

FIG. 6 shows one embodiment in which device 16 is a tablet computer 600. In FIG. 6, computer 600 is shown with user interface display from FIG. 3F displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
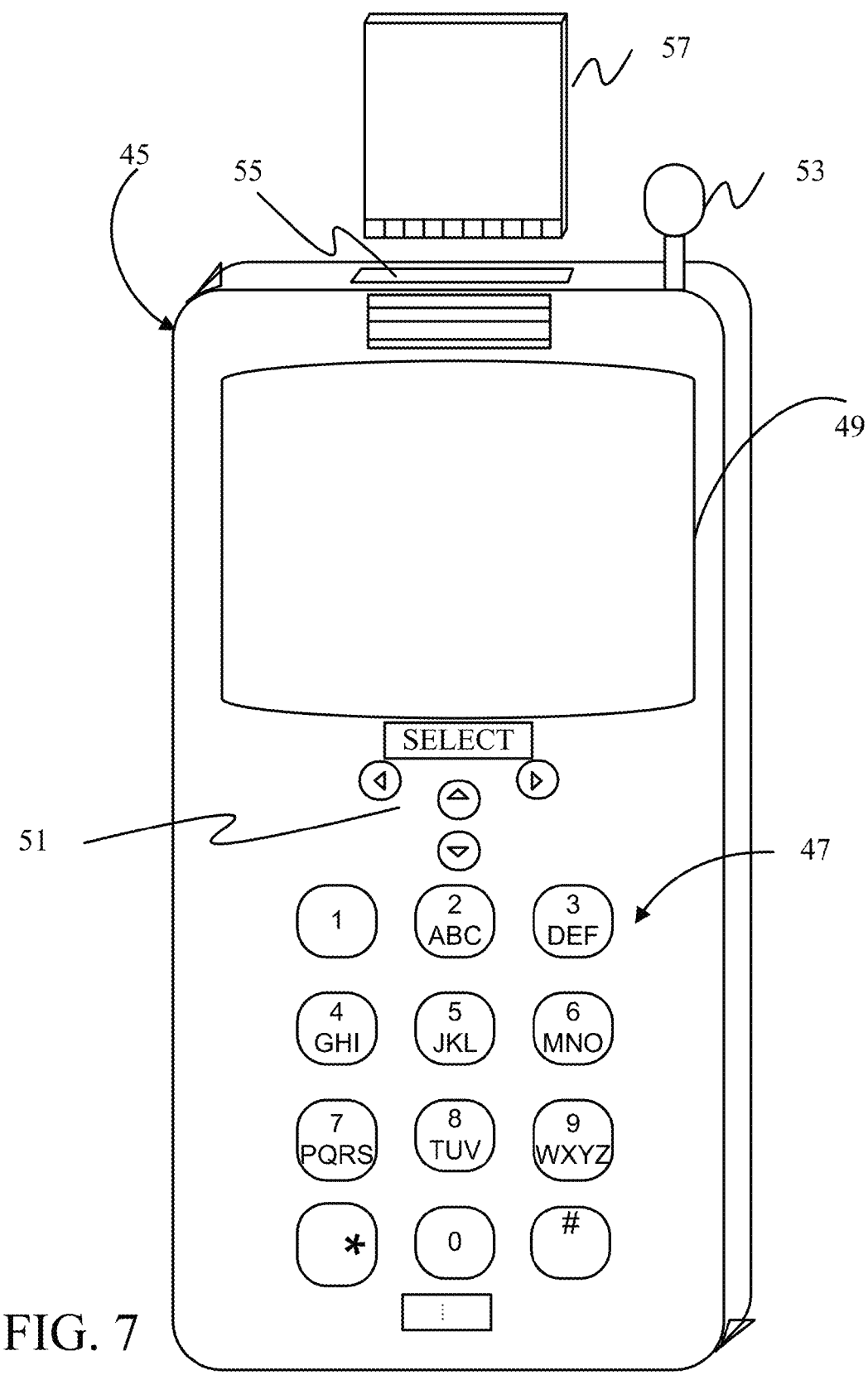
Figure 8:
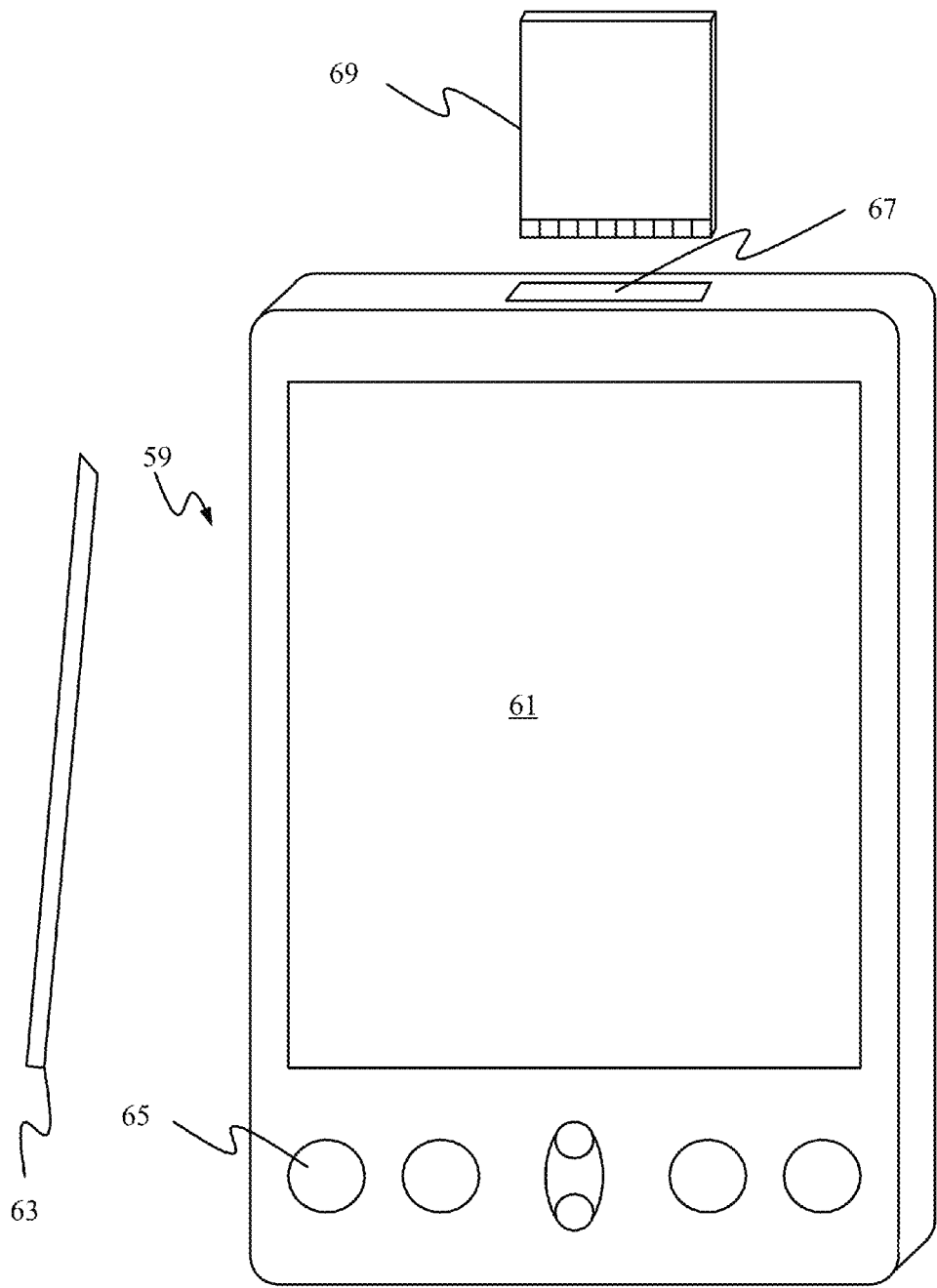

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
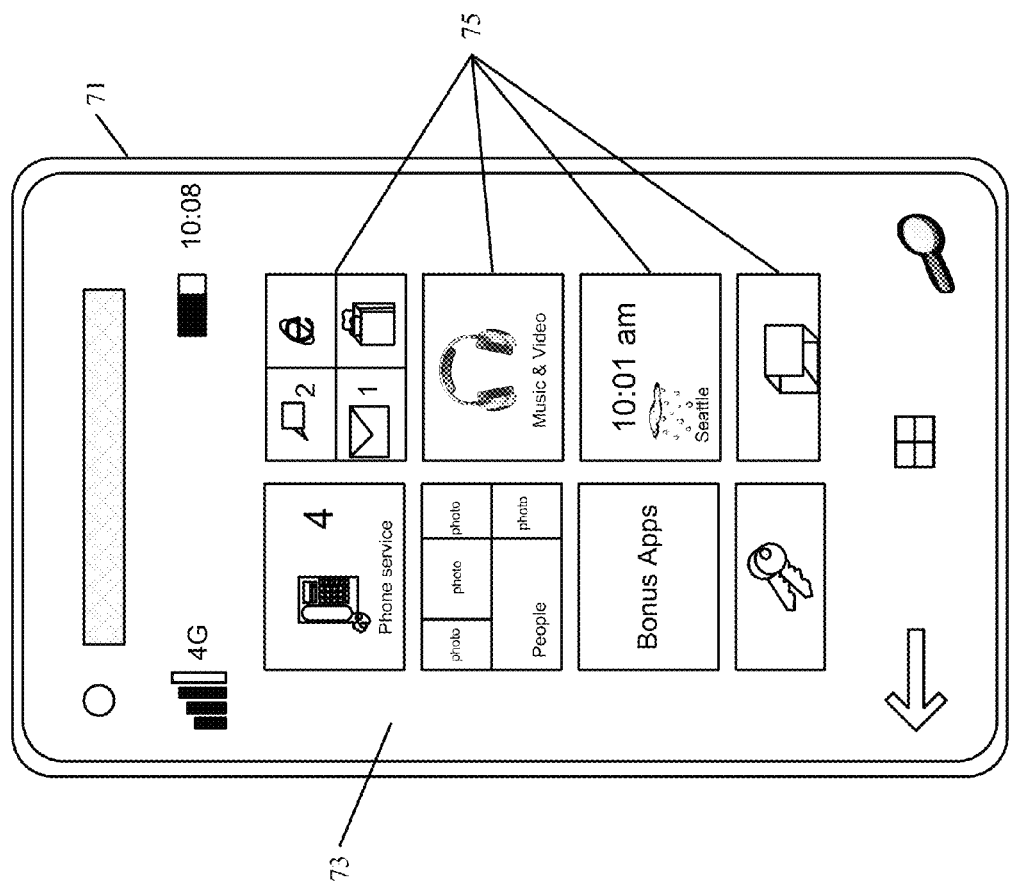
Figure 10:
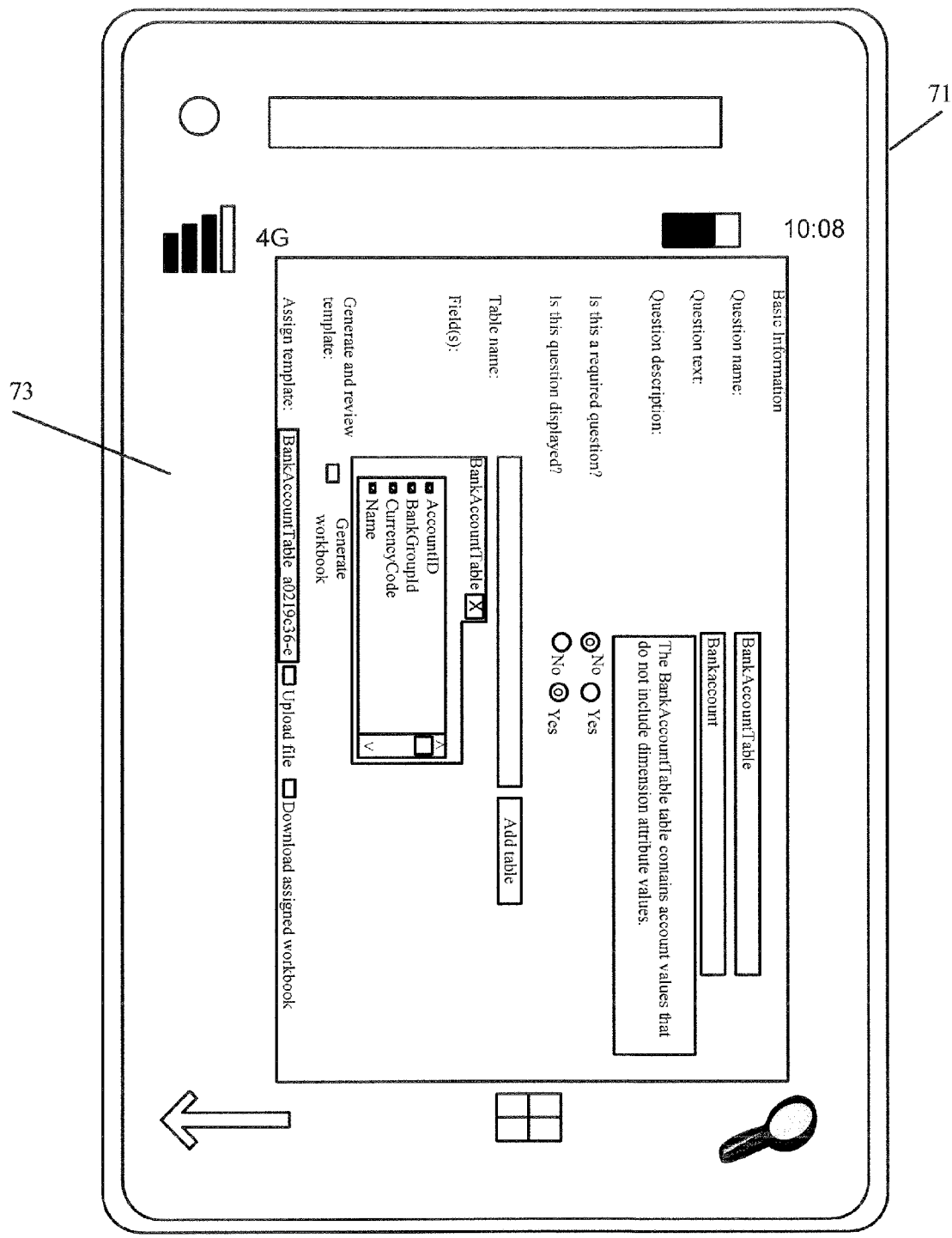

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows smart phone 71 with the display of FIG. 3G displayed on it.

Note that other forms of the devices 16 are possible.

Figure 11:
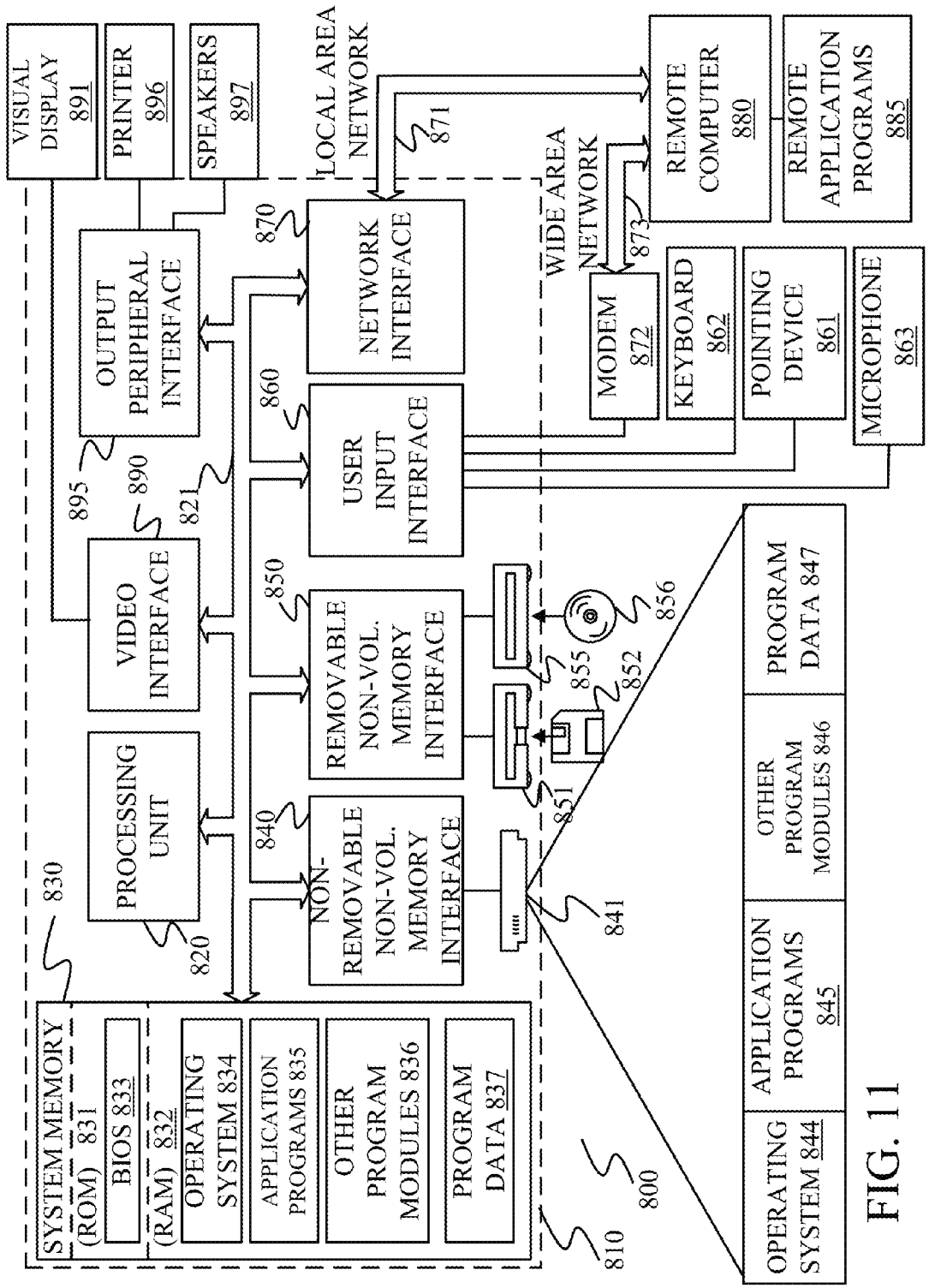
FIG. 11 is a block diagram of one illustrative computing environment.

FIG. 11 is one embodiment of a computing environment in which architecture 130, or system 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 102, 146 or 150), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
    obtaining, by a computing process modeler, a representation of a source computing process, wherein the representation models activities in the source computing process that perform computing process functionality;
    generating, by the computing process modeler, a representation of a user interface display comprising a selection user input mechanism for user selection of a configuration tool instance;
    receiving an indication of user actuation of the selection user input mechanism, identifying a configuration tool instance that is to be used;

based on the identified configuration tool instance, translating the representation of the source computing process to a translated representation, wherein the translated representation conforms to a format of the identified configuration tool instance and represents the modeled activities in the source computing process;

using the identified configuration tool interface to generate a configuration template from the translated representation, wherein the configuration template is generated based on the modeled activities in the source computing process and comprises a user configuration input mechanism that receives an indication of a user configuration input; and based on the indication of the user configuration input, configuring a computing system instance for runtime operation, the configured computing system instance having the computing process functionality.

2. The computer-implemented method of claim 1 wherein the configuration template is generated to include a series of prompts that are presented to a user to define the configuration of the computing system instance, the series of prompts pertaining to the computing process functionality.

3. The computer-implemented method of claim 2 wherein obtaining a representation of the source computing process comprises:

obtaining a first representation of the source computing process at the computing process modeler, and wherein receiving an indication of user actuation comprises:
receiving an indication of a user synchronization input at the computing process modeler to send the representation of the source computing process to the identified configuration tool instance.

4. The computer-implemented method of claim 2 and further comprising:

receiving the indication of the user configuration input to obtain a configured configuration template; and
applying the configured configuration template to the computing system instance to obtain the configured computing system instance that has the computing process functionality of the source computing process.

5. The computer-implemented method of claim 1 wherein generating a representation of a user interface display comprises:

generating a representation of a list of user actuatable input mechanisms, each corresponding to a different configuration tool instance;
receiving an indication of user actuation of a particular one of the user actuatable input mechanisms; and
selecting the configuration tool instance corresponding to the particular user actuatable input mechanism as the identified configuration tool instance.

6. The computer-implemented method of claim 5 wherein generating a configuration template comprises:

receiving the translated representation at the configuration tool instance corresponding to the particular user actuatable input mechanism actuated by the user.

7. The computer-implemented method of claim 6 wherein generating a configuration template comprises:

generating a set of templates and sub-templates with the identified configuration tool instance based on the translated representation.

8. The computer-implemented method of claim 7 wherein the configuration tool instance comprises an instance of a question-based system configuration tool, and wherein generating a configuration template comprises:

generating a question that is answered by the user configuration input.

9. The computer-implemented method of claim 8 wherein generating a question comprises:

generating a set of question in question groups, each group comprising questions that are related by subject matter.

10. The computer-implemented method of claim 9 wherein translating comprises:

translating the recorded representation of the source computing process into a representation having a schema expected by the configuration tool instance.

11. An electronic configuration system, comprising:

at least one processor; and
memory storing instructions executable by the at least one processor, wherein the instructions configure the electronic configuration system to provide a computing process modeler and a system configuration tool;
wherein the computing process modeler is configured to:
provide a representation of a computing process, wherein the representation models activities in the computing process that perform process functionality;
generate a representation of a selection user input mechanism that is actuated to identify a configuration tool instance; and
translate the representation of the computing process into a translated representation of the computing process based on the identified configuration tool instance, wherein the translated representation conforms to a format of the identified configuration tool instance and represents the modeled activities in the computing process; and
wherein the system configuration tool is configured to:
receive the translated representation of the computing process;
based on the translated representation, generate a configuration template, wherein the configuration template is generated based on the modeled activities in the computing process and comprises a user input mechanism that receives an indication of a user configuration input; and
based on the indication of the user configuration input, generate a configured computing system instance for runtime operation that has the computing process functionality.

12. The electronic configuration system of claim 11 wherein the configuration template is generated to include a series of prompts that are presented to a user to define the configuration of the computing system instance, the series of prompts pertaining to the computing process functionality.

13. The electronic configuration system of claim 11 wherein the computing process modeler comprises:

a translation component configured to receive a first representation of the computing process and translate the first representation into a second representation of the computing process according to a schema that is expected by the system configuration tool.

14. The electronic configuration system of claim 13 wherein the computing process modeler models the computing process as the first representation of the computing process.

15. The electronic configuration system of claim 11 wherein the system configuration tool is configured to generate the configuration template as a hierarchical set of templates, sub-templates, question groups and questions, each having the user input mechanism to receive the user configuration input.

16. A computing system comprising:

a processor; and memory storing instructions executable by the processor, wherein the instructions configure the computing system to:
  obtain a first representation of a source computing process, the first representation modeling activities in the source computing process that perform computing process functionality;
  generate a representation of a configuration instance selection user interface display with a selection user input mechanism;
  receive an indication of user actuation of the selection user input mechanism;
  based on the indication of user actuation of the selection user input mechanism, identify a configuration tool instance;
  slating-based on the identified configuration tool instance, translate the first representation of the source computing process to a second representation, wherein the second representation conforms to a format of the identified configuration tool instance and represents the modeled activities in the source computing process;
  use the identified configuration tool instance to generate a configuration template, from the second representation, wherein the configuration template is generated based on the modeled activities in the source computing process and comprises a user configuration input mechanism that receives an indication of a user configuration input; and
  based on the indication of the user configuration input, configure a computing system instance for runtime operation, the configured computing system instance having the computing process functionality.

17. The computing system of claim 16, wherein the instructions configure the computing system to:
  receive a user synchronization input to send the second representation of the source computing process to the identified configuration tool instance.

18. The computing system of claim 17 wherein the instructions configure the computing system to:
  generate the configuration template as a hierarchical set of templates, sub-templates, question groups and questions, each having the user input mechanism to receive the user configuration input.

19. The computing system of claim 17 wherein the instructions configure the computing system to:
  translate the first representation into the second representation that has the format that is expected by the identified configuration tool instance.

20. The computing system of claim 16 wherein the configuration template is generated to include a series of prompts that are presented to a user to define the configuration of the computing system instance, the series of prompts pertaining to the computing process functionality.

* * * * *